(12) United States Patent
Yamada et al.

(10) Patent No.: US 9,882,379 B2
(45) Date of Patent: Jan. 30, 2018

(54) POWER SOURCE SYSTEM

(71) Applicant: FUJI ELECTRIC CO., LTD., Kawasaki-shi (JP)

(72) Inventors: Ryuji Yamada, Hachioji (JP); Koji Kawaguchi, Chigasaki (JP); Hiroyuki Oguchi, Chofu (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 262 days.

(21) Appl. No.: 14/846,627

(22) Filed: Sep. 4, 2015

(65) Prior Publication Data
US 2016/0006242 A1 Jan. 7, 2016

Related U.S. Application Data

(63) Continuation of application No. PCT/JP2013/070644, filed on Jul. 30, 2013.

(51) Int. Cl.
| | | |
|---|---|---|
| *H02J 1/10* | (2006.01) | |
| *H02J 9/06* | (2006.01) | |
| *H02M 7/04* | (2006.01) | |
| *H02J 7/34* | (2006.01) | |
| *H02J 1/14* | (2006.01) | |
| *H02J 9/00* | (2006.01) | |

(52) U.S. Cl.
CPC ............... *H02J 1/10* (2013.01); *H02J 1/102* (2013.01); *H02J 1/14* (2013.01); *H02J 7/34* (2013.01); *H02J 9/06* (2013.01); *H02M 7/04* (2013.01); *H02J 9/00* (2013.01)

(58) Field of Classification Search
CPC ...................................................... H02J 3/005
See application file for complete search history.

(56) References Cited

U.S. PATENT DOCUMENTS

| | | | | |
|---|---|---|---|---|
| 7,394,674 B2 * | 7/2008 | Huang | ...... | G06F 1/30 |
| | | | | 307/64 |
| 9,673,625 B2 * | 6/2017 | Yamada | ...... | H02J 1/08 |
| 2011/0169471 A1 | 7/2011 | Nagasawa | | |

FOREIGN PATENT DOCUMENTS

| | | |
|---|---|---|
| EP | 2249468 A1 | 11/2010 |
| JP | H09-103032 A | 4/1997 |
| JP | 2003-079069 A | 3/2003 |
| JP | 2005-168090 A | 6/2005 |
| JP | 2005-168107 A | 6/2005 |
| JP | 2012-253933 A | 12/2012 |

(Continued)

*Primary Examiner* — Hai L Nguyen
(74) *Attorney, Agent, or Firm* — Rabin & Berdo, P.C.

(57) ABSTRACT

A power source system for supplying DC (direct current) power to a load, including first and second power source apparatuses and a control apparatus. The first power source apparatus is connected to an alternating current (AC) power source, and configured to convert AC power received from the AC power source to first DC power. The second power source apparatus is connected to a battery, and configured to convert power of the battery to second DC power. The control apparatus is connected to the first and second power source apparatuses, and configured to so control the first and second power source apparatuses that the DC power supplied to the load is the first DC power in a normal mode, the second DC power in a back-up mode, and a combination of the first and second DC power in an assist mode.

15 Claims, 4 Drawing Sheets

(56) References Cited

FOREIGN PATENT DOCUMENTS

| JP | 2013-013176 A | 1/2013 |
|----|---------------|--------|
| JP | 2013-046454 A | 3/2013 |
| WO | WO-02/061917 A1 | 8/2002 |

* cited by examiner

POWER SOURCE SYSTEM

CROSS-REFERENCE TO RELATED APPLICATIONS

This application is a continuation application under 35 U.S.C. 120 of International Application PCT/JP2013/070644 having the International Filing Date of Jul. 30, 2013. The identified application is fully incorporated herein by reference.

TECHNICAL FIELD

The present invention relates to a power source system that is configured by combining a power source unit and a battery unit, and is capable of supplying power greater than the total output of the power source unit to a load by supplying power from a battery unit temporarily, in other words, relates to a power source system having a power assist function.

BACKGROUND OF THE INVENTION

FIG. 1 is a diagram showing the configuration of a power source system disclosed in Japanese Patent Application Publication No. 2013-046454 (hereinafter "JPA '454"; see, e.g., FIG. 1, FIG. 2). The power source system shown in FIG. 1 is constituted by a three-phase commercial power source E, a DC (direct current) power source apparatus 501 and a load RL, and of these, the DC power source apparatus 501 is constituted by a power storage apparatus 60, a plurality of DC power source apparatus units 1 to N, one charging/spare unit, and a monitoring unit 81 including an operational state determination unit 82, an output voltage monitoring unit 83, a droop operation control unit 84, a charging voltage detection unit 85 and a constant-current charging control unit 86.

During a normal operation, the DC power source apparatus 501 operates n DC power source units 1 to N and supplies power to the load RL having constant power characteristics, and if there is a fault in any one of the DC power source units 1 to N, the charging/spare unit is used as a substitute unit for the unit suffering a fault. In the example illustrated, three-phase AC power is used as the input power source, but a configuration in which a single-phase AC power is used as the input source may also be used.

When an AC input from the commercial power source E is lost due to a power outage, power is supplied to the load RL from a storage battery 61 via a diode DX1. Furthermore, in this DC power source apparatus 501, the charging/spare unit, as well as being used as a spare power source unit, also serves as a charger for the storage battery 61.

When an output voltage is supplied to the load RL from the DC power source units 1 to N, since the charging/spare unit and the storage battery 61 are separated from the load RL side, a reverse bias voltage is applied to the diode DX1.

The DC power source units 1 to N and the charging/spare unit have constant-current droop characteristics which limit the output current to a prescribed rated current (100% continuous rated current), in order to prevent damage to the units, during normal operation, and the constant-current droop characteristics can be switched temporarily to constant-power droop characteristics in the event of prescribed trigger conditions (conditions which are set in accordance with the operational state of the DC power source apparatus 501), for example, in the event of trigger conditions such as power source recovery after a power outage.

A voltage sensor VT1 detects the output voltage Vo (=load voltage VL) of the DC power source apparatus 501. The voltage sensor VT2 detects the charging voltage of the storage battery 61. A current sensor CT1 detects the charging current of the storage battery 61.

A monitoring unit 81 communicates with the DC power source units 1 to N and the charging/spare unit, and monitors the operational state of the DC power source units 1 to N and the charging/spare unit, as well as sending a control command signal (for example, a droop characteristics switching command signal) to the DC power source units 1 to N and the charging/spare unit.

The operational state determination unit 82 receives input of operational state signals St1 to StN from the DC power source units 1 to N, and receives input of an operational state signal Stc from the charging/spare unit. Consequently, the operational state determination unit 82 detects (determines) the operational state of the DC power source unit and the charging/spare unit, the occurrence of and recovery from faults, and restoration of power after a power outage, and the like.

On the basis of the operational state signals received from the DC power source units 1 to N and the charging/spare unit, the operational state determination unit 82 determines whether the system is in a normal operational state in which all of the units are operating normally, for example, or a start-up state after restoration of power from a power outage, or a state of starting operation after recovering a DC power source unit that has suffered a fault.

The output voltage monitoring unit 83 receives input of a voltage detection signal from the voltage sensor VT1 and monitors the output voltage Vo of the DC power source apparatus 501. Furthermore, the droop operation control unit 84 controls the droop characteristics of the DC power source units 1 to N and the charging/spare unit, in accordance with the state of operation of the DC power source units 1 to N and the charging/spare unit. Moreover, the charging voltage detection unit 85 receives an input of a voltage detection signal from the voltage sensor VT2 and monitors the charging voltage of the storage battery 61.

The constant-current charging control unit 86 controls the charging/spare unit so as to perform a constant-current output operation, when carrying out constant-current charging from the charging/spare unit to the storage battery 61. During the constant-current charging described above, the constant-current charging control unit 86 in the monitoring unit 81 performs constant-current charging to the storage battery 61 by controlling the output current of the charging/spare unit. In this case, the constant-current charging control unit 86 detects the charging current flowing to the storage battery 61 by the current sensor CT1 and controls the output current of the charging/spare unit so as to become a prescribed constant current value. In the power source system disclosed in JPA '454, a plurality of DC power source units are connected in parallel, the output line thereof is backed up by a battery during a power outage, and the droop characteristics of the power source unit are controlled so as to supply current at or above a rated current, temporarily.

BRIEF SUMMARY OF THE INVENTION

In a power source system where the load is a server, or the like, in a data center, the consumed power changes in accordance with the amount of information processed by the server, etc. It is necessary to set a value exceeding the peak load as the rated power, for the power source capacity, but as a result of this, a problem arises in that the system operates for the majority of the time at an output significantly lower than the rating, the capacity of the power source equipment is excessively large in relation to the average power consumption, and the equipment costs become large.

Meanwhile, a power source system which has a server as described above, or the like, normally has a battery back-up equipment which is provided for power outages. If a portion of the battery capacity is used, and a portion of the power is allocated to the battery during peak load, then the power source equipment capacity can be made smaller, theoretically.

However, in the power source system disclosed in JPA '454 which is illustrated in FIG. 1, the battery 61 is connected to a DC bus without passing via power control means, and the distribution of the power load cannot be controlled. When a charging/spare unit is provided, if the battery undertakes all of the power load during peak load, there is a risk that the amount of power provided for back up will be insufficient in the event that a power outage actually occurs, and furthermore, frequent full-load discharging of the battery is not desirable from the perspective of the battery life.

This problem can be resolved by providing power control means on the battery side, but in this case also, if using a method wherein, for example, the full-load amount is detected and transmitted to a common control apparatus which determines the output distribution of the power source units and the battery unit and issues an instruction accordingly, in order to achieve appropriate distribution of the load between the power source unit group and the battery, it is necessary to transmit a continuous amount of data at high speed, and therefore, costs rise due to the increase in the number of components, and if a problem occurs in the common control apparatus, there is a risk of this obstructing the operation of all of the units.

The present invention was devised in view of the foregoing circumstances, and provides a power source system whereby a distributed power load undertaken by a battery during peak load can be controlled appropriately, without providing a complicated common control apparatus and/or large-scale two-way communication means.

Specifically, the present invention is a power source system in which the output units of one or more first power source apparatus which receives a supply of power from an AC or DC power source, adjusts the voltage to a uniform range and supplies the voltage to a load, and one or more second power source apparatus which receives a supply of power from a storage battery, adjusts the voltage to a uniform range and supplies the power to a load, are connected in parallel;

wherein the power source system has three operation modes: a normal mode, a back-up mode and an assist mode, in the normal mode, power is supplied from the first power source apparatus when the AC or DC power source is healthy and the load is within the rated range of the power source system, in the back-up mode, power is supplied from the second power source apparatus when the AC or DC power source is suffering an outage, in the assist mode, a shortage of power is supplied from the second power source apparatus, when the load is greater than the sum of the rated output of the first power source apparatus, or the voltage of the AC or DC power source has fallen, or the number of operable apparatuses among the plurality of first power source apparatuses has fallen, the first power source apparatus and the second power source apparatus each have respectively independent voltage detection means, output current means for detecting the output current of the power source apparatus, and communication means for receiving instruction of the abovementioned three modes, and the power supply amount of the second power source system in the assist mode is adjusted by the output voltage of the power source system.

According to the present invention, it is possible to distribute the power load undertaken by a battery at peak load, without providing a complicated common control apparatus or large-scale communication means, and the power source equipment capacity can be reduced.

BRIEF DESCRIPTION OF THE DRAWINGS

FIG. 5 is a diagram showing an example of the operation of a power source system relating to an embodiment of the invention.

DETAILED DESCRIPTION OF THE INVENTION

Below, desirable embodiments of the present invention are described with reference to the drawings.

Figure 1:
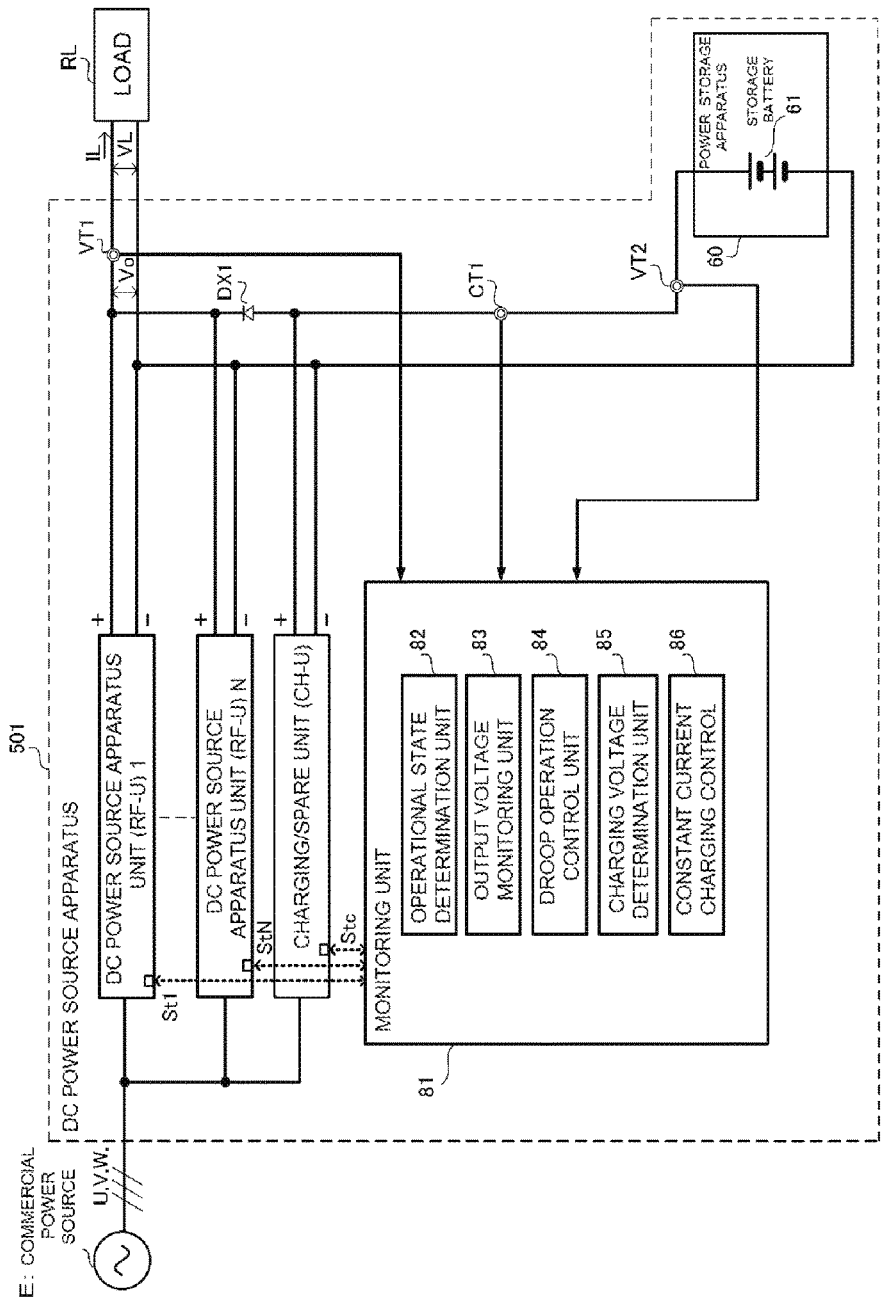
FIG. 1 is a diagram showing a configuration of a conventional power source system disclosed in Patent Document JPA '454.
Figure 2:
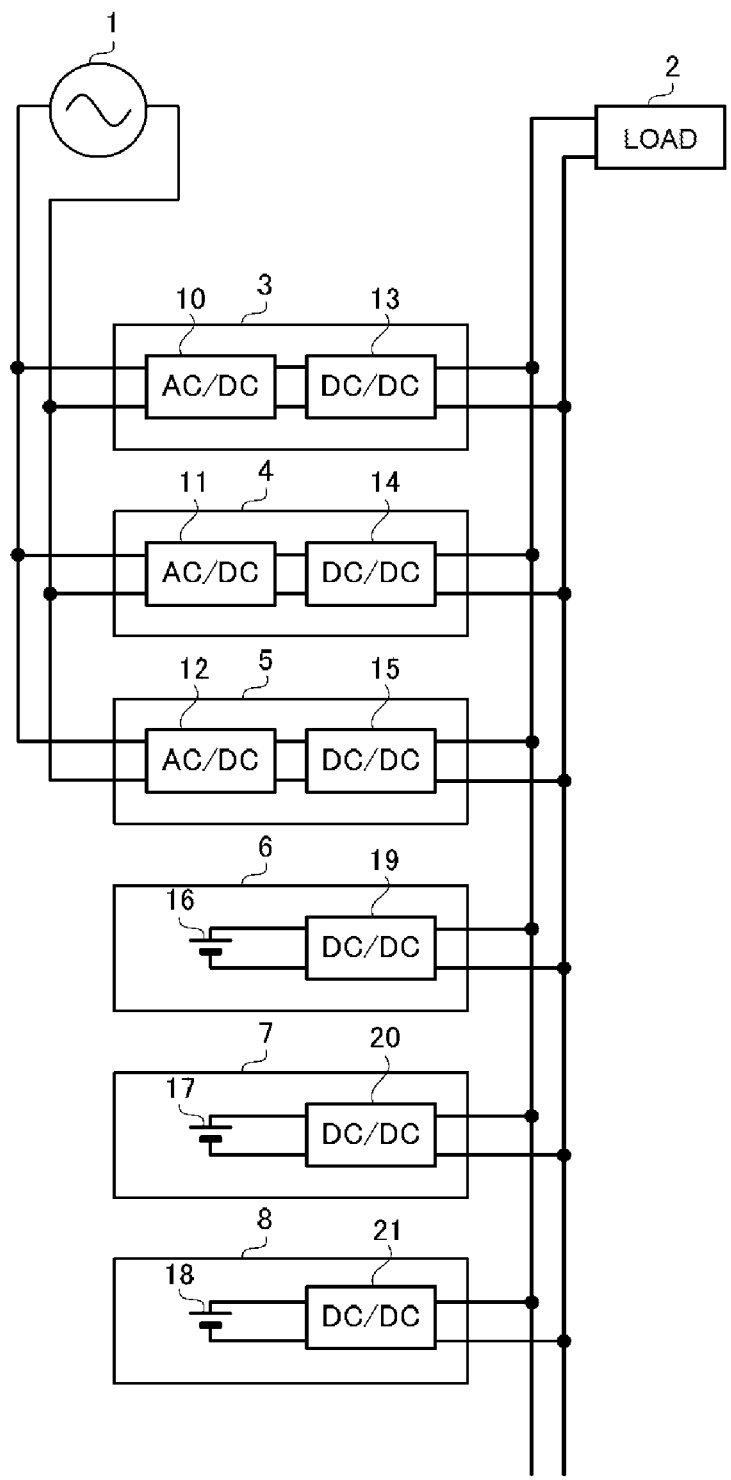
FIG. 2 is a block diagram showing an example of the configuration of a power source system relating to an embodiment of the invention.

FIG. 2 is a block diagram showing an example of the configuration of a power source system relating to an embodiment of the invention. The power source system relating to the embodiment of the present invention shown in FIG. 2 is constituted by an AC (alternating current) power source 1, a load 2, power source units 3 to 5 which receive input of an AC power source 1 and supply a substantially constant voltage, for example, 12V, to the load 2, and battery units 6 to 8 which supply power from a built-in battery.

The power source units 3 to 5 and battery units 6 to 8 described above are connected in parallel to a common DC bus which is connected therebetween. The parallel number of power source units 3 to 5 and battery units 6 to 8 is shown as three each in FIG. 2, but is not limited to this number.

The constituent elements of the power source units 3 to 5 may include AC/DC conversion circuits 10 to 12 and DC/DC conversion circuits 13 to 15. Generally, an insulated input/output circuit is used for the DC/DC conversion circuits 13 to 15. The constituent elements of the battery units 6 to 8 may include batteries 16 to 18, and DC/DC conversion circuits 19 to 21. The DC/DC conversion circuits 19 to 21 may be insulated or non-insulated circuits. Furthermore, the DC/DC conversion circuits 19 to 21 may carry out one-directional power conversion from the battery unit side to the DC bus side, and battery charging means (not illustrated) may be provided separately, but by adopting a circuit capable of bi-directional power conversion, the circuit can also serve as a charging circuit.

The power source system relating to an embodiment of the present invention shown in FIG. 2 operates in any one of normal mode, back-up mode and assist mode. Normal mode is a mode in which power is supplied to the load 2 by the power source units 3 to 5. Back-up mode is a mode in which the battery units 6 to 8 supply power to the load 2 when there is a power outage of the AC power source 1. Assist mode is a mode in which, when the power supplied to the load from the power source units 3 to 5 is insufficient, the power equivalent to the shortage is supplied by the battery units 6 to 8. For example, this power source system operates in assist mode in cases where the power of the load 2 exceeds the total rated power of the power source units 3 to 5, where the input voltage falls, without reaching a power outage, and sufficient power cannot be supplied, or where a portion of the power source units 3 to 5 are halted due to a fault, maintenance, or the like. The assist mode is described in further detail hereinafter.

In general, the voltage of a battery falls with discharging. The amount of reduction in the voltage is greater, the larger the discharge current, and tends to increase as discharging progresses. The DC/DC conversion circuits 19 to 21 perform an operation for keeping the DC bus voltage substantially uniform, regardless of voltage change in the battery.

Figure 3:
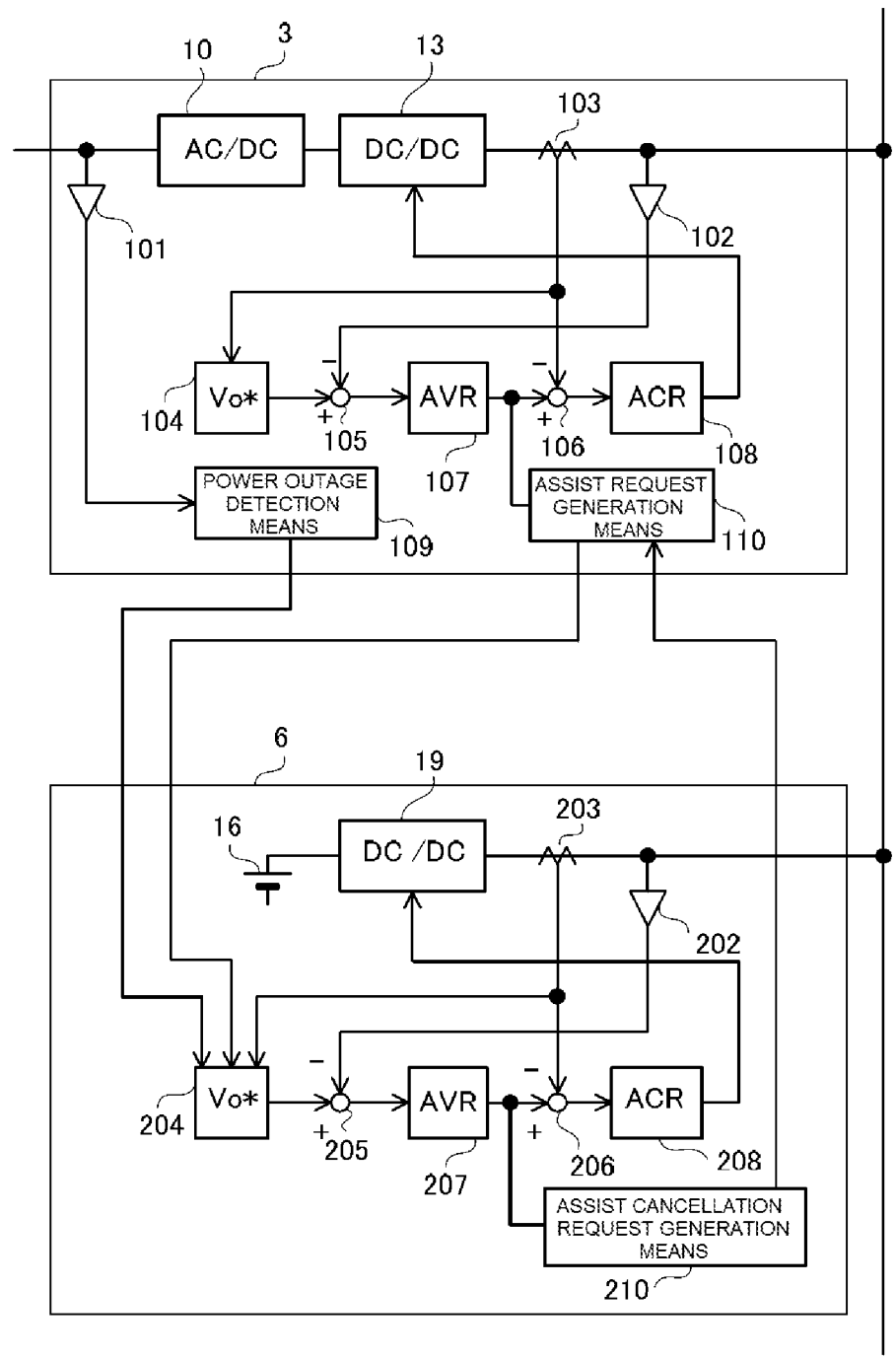
FIG. 3 is a diagram showing the configuration of power source units and battery units, including a control system, according to an embodiment of the present invention.

FIG. 3 is a diagram showing the configuration of power source units and battery units, including a control system, according to an embodiment of the present invention. FIG. 3 shows, as a representative example, a case where there is one power source unit and one battery unit, but it is possible to connect two or more of each of these units in a parallel arrangement, similarly to the configuration shown in FIG. 2.

In FIG. 3, 101, 102, 202 respectively indicate a voltage detector, 103 and 203 respectively indicate a current detector, 104 and 204 respectively indicate voltage command value setting means, and 105, 106, 205 and 206 respectively indicate an adder. 107 and 207 indicate a voltage regulator (Auto Voltage Regulator), which is constituted by a PI (proportional/integral) regulator (Proportional & Integral Regulator), or the like. Furthermore 108, 208 indicate a current regulator (Auto Current Regulator), which is constituted by a PI (proportional/integral) regulator, or the like, similarly to the voltage regulator.

In the power source unit 3 in FIG. 3, the output voltage is detected by the voltage detector 102, and a current command value is output by the voltage regulator 107 by finding the differential between the output voltage and the voltage command value from the voltage command value setting means 104. The current command value is large when the output voltage is insufficient and is small when the output voltage is excessively large. The differential between the current command value and the output current detected by the current detector 103 provided in the power source unit 3 is found, and the internal electromotive force of the DC/DC converter 13 is increased or decreased so as to make the differential approach 0.

On the other hand, in the case of the battery unit 6, the differential between the current command value output from the voltage adjuster 207 and the output current detected by the current detector 203 provided in the battery unit 6 is found, and the internal electromotive force of the DC/DC converter 19 is increased or decreased so as to make the differential approach zero.

Furthermore, a limiter (not illustrated) is provided for the current command value when input to the current regulators 108, 208, so as not to output a current exceeding the rated current, irrespective of the load.

As shown in FIG. 2, in many cases, the power source system relating to an embodiment of the present invention uses a plurality of power source units and battery units in a parallel connection arrangement. In this case, control based on the droop characteristics of each unit is implemented in order to achieve a current balance in each of the units.

Figure 4:
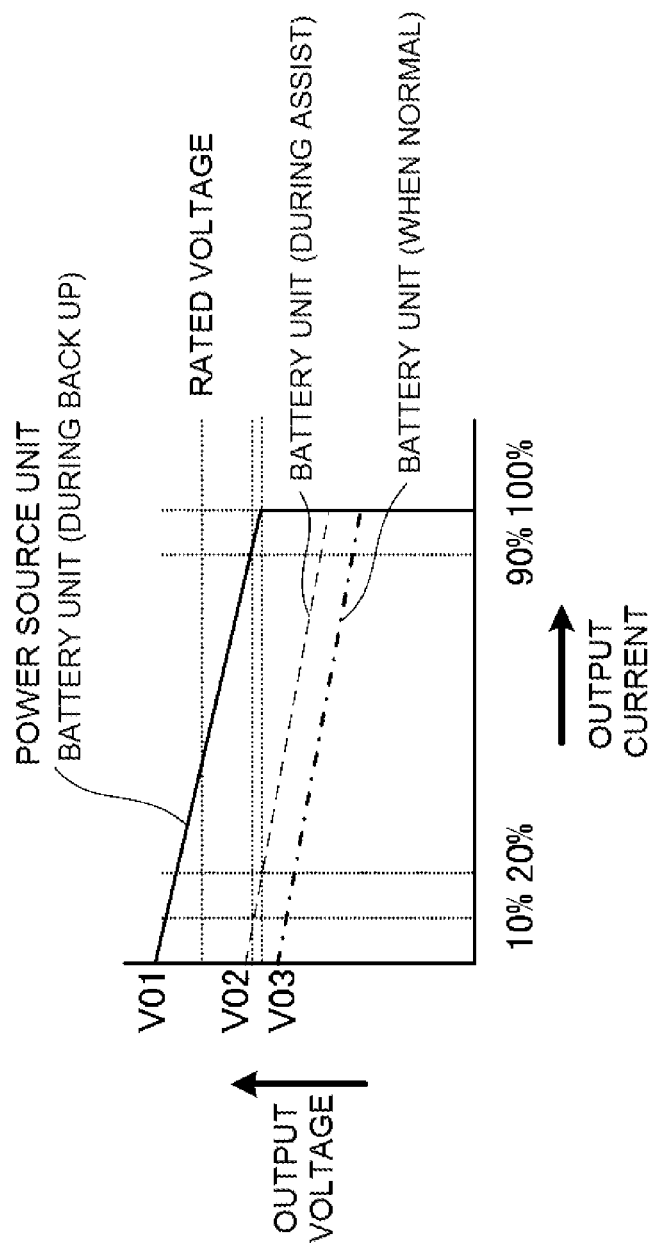
FIG. 4 is a diagram illustrating the details of droop characteristics relating to an embodiment of the present invention.

FIG. 4 is a diagram illustrating the details of droop characteristics relating to an embodiment of the present invention. As shown in FIG. 4, the droop characteristics mean that the output voltage falls in accordance with the output current. When the output current of a particular unit is large, the current in that unit falls due to narrowing of the voltage as a result of the droop characteristics. As a result of this, the output currents of the units become balanced when the full-load current is a value close to the fraction of the parallel number. The range of variation of the output voltage due to this is constricted to the range of the output voltage accuracy which is defined by the apparatus specifications.

The droop characteristics of the battery units 6 to 8 are described further here with reference to FIG. 4. Here, it is supposed that the voltage command value at zero load (indicated by the symbol "VOC" below) is switched between VO1, VO2, VO3 in the battery units 6 to 8 in accordance with the operation mode. In order to simplify the explanation, the output ratings of the power source units 3 to 5 and the battery units 6 to 8 are the same, and the parallel number is the same. The rated value of the output current is taken to be 100%.

The battery units 6 to 8 undertake the whole of the power load, when in the back-up mode. Therefore, the droop characteristics of the battery units 6 to 8 when in the back-up mode are set to be the same as the droop characteristics of the power source units 3 to 5 when in the normal mode (see FIG. 4, upper part).

When in the assist mode, the VOC (voltage command value) is reduced to VO2, in such a manner that the output voltage value when the power source units 3 to 5 output 100% current and the output voltage value when the battery units 6 to 8 output 20% current become equal. For instance, when the input current of the load 2 is equivalent to 120% of the rated value, then the output current of the two units is balanced when the power source units 3 to 5 output 100% current, and the battery units 6 to 8 output 20% current, and the system is operated at this ratio. Thereby, unwanted discharging of the battery units 6 to 8 is avoided (see FIG. 4, middle part).

When in the normal mode, the VOC (voltage command value) of the battery units 6 to 8 is reduced to the value VO3, which is lower than the output voltage value when the power source units 3 to 5 output 100% current. Accordingly, it is possible to avoid the occurrence of continuous discharging from the battery units 6 to 8. On the other hand, when the power source units 3 to 5 deviate from the normal output range due to a sudden change in the load, or the like, then the amount of variation in the voltage can be suppressed by discharge from the battery units 6 to 8 (see FIG. 4, lower part).

In FIG. 4, the current load distribution is adjusted by means of the voltage command value (VOC) at zero load, but it is also possible to adjust the current load by the amount of droop, in other words, the amount of reduction in the output voltage with respect to the output current. Alternatively, it is also possible to adjust the current load distribution by using both the voltage command value (VOC) at zero load and the amount of droop.

Next, a method for setting the VOC in the battery units will be described with reference to FIG. 3. 109 is power outage detection means which detects an input power outage. 110 is assist request generation means which outputs an assist request signal when the current command value in the power source unit is greater than a specific value, for example, the equivalent of 100% output. 210 is an assist cancellation request generation means for outputting a signal requesting cancellation of the assist mode when the current command value in the battery unit is lower than a specific value, for instance, 10%.

When the power outage does not occur and there is no assist request, then the voltage command value setting means 204 sets the VOC (voltage command value) to VO3, and outputs the current command value according to the existing droop settings (see FIG. 4, lower part). When a power outage occurs, the voltage command value setting means 204 sets the VOC (voltage command value) to VO1, regardless of whether or not there is an assist request (see FIG. 4, upper part). When the assist request generation means 110 outputs an assist request without the occurrence of a power outage, then the voltage command value setting means 204 sets the VOC (voltage command value) to VO2 (see FIG. 4, middle part). Therefore, the output from the battery units 6 to 8 is set to a prescribed ratio with respect to a load 2 which exceeds 100% of the rating. The fact that the current command value of the power source units 3 to 5 exceeds 100% does not necessarily mean that the input current of the load 2 exceeds 100%. When the voltage of the AC power source 1 falls without reaching a power outage, the AC/DC conversion units 10 to 12 of the power source units 3 to 5 cannot input current equal to or exceeding a specific level, and therefore the power is insufficient, as a result of which the output voltage falls.

Furthermore, if one of the power source units 3 to 5 stops due to a fault, near to 100% load, or if any one of the power source units is removed for the purpose of maintenance, then the supply power is insufficient in the remaining units and the output voltage falls in a similar manner.

The voltage regulator 107 of the power source units 3 to 5 increases the current command value in an attempt to restore this voltage fall, and therefore a current exceeding the rating is output (although a current exceeding the rating is not actually output due to the limiter described above). In cases of this kind as well, similarly to the description given above, an assist operation is performed by the battery units 6 to 8, of course.

When the output current of the power source units 3 to 5 falls to 100% or below, a current is output from the battery units 6 to 8, up to 80%, under the settings described above. Discharge is performed from the battery units 6 to 8 in a region where an assist operation is not actually required, which is not desirable. The assist cancellation request generation means 210 serves to avoid this situation and, for instance, outputs an assist mode cancellation request signal to the assist request generation means 110, when the output current of the battery units 6 to 8 is lower than 10%. The assist request generation means 110 determines that the total load current is equal to or less than 100% and cancels the assist request, when the output current of the host power source unit in this case is lower than 90%. When the output current of the host power source unit is not lower than 90%, then the assist mode is maintained (not cancelled), because if the assist mode is cancelled, there is a risk of a current shortage occurring due to current detection errors and/or imbalance between the units.

FIG. 5 is a diagram showing an operation waveform of a power source system relating to an embodiment of the invention. When the load current increases and exceeds 100%, as shown in the upper half of FIG. 5, the output current of the power source units 3 to 5 is limited to 100% by the limiter, whereas when the system is in assist mode, the output from the battery units 6 to 8 is applied, as shown in the lower half of FIG. 5, and a current exceeding 100% is supplied. When the load current falls below 100%, the output current of the battery units 6 to 8 falls below 10%, and the output current of the power source units 3 to 5 falls below 90%, and therefore the assist mode is cancelled and all of the load current is supplied from the power source units 3 to 5.

The simplest method for switching mode when a plurality of power source units 3 to 5 and battery units 6 to 8 are connected in parallel to a DC bus is to adopt a wired OR method, or the like, and interpret that an assist request has been generated when an assist request has been issued by any one of the power source units 3 to 5, and interpret that an assist cancellation request has been generated when all of the battery units 6 to 8 have issued an assist cancellation request. This is the safest method for avoiding output shortages, but if, for example, the range of error of the current detection and control is clear, then it is also possible to interpret that an assist request has been generated, when it can been determined that the range of output voltage drop is within a tolerable range, even while still waiting for the power source unit having the smallest output current to issue an assist request due to an imbalance in the parallel arrangement, or when all of the power source units 3 to 5 have issued an assist request. Alternatively, it is also possible to interpret that an assist request has been generated, when a prescribed number or prescribed proportion of the power source units 3 to 5 has issued an assist request. The same also applies to the assist cancellation request.

Each unit outputs an assist request or assist cancellation request using a current command value, but may also output an assist request or assist cancellation request using an output current.

According to the power source system relating to the embodiment of the present invention described above, a continuous amount, such as current or voltage, is transmitted between units or to an upper-level control apparatus, and complicated control for determining the presence or absence of an assist operation, and adjusting the assist amount in each battery unit, and the like, is not necessary, and therefore it is possible to achieve a desired operation with a configuration in which the signal transmission system and the control system are greatly simplified compared to a conventional method.

INDUSTRIAL APPLICABILITY

The present invention can be applied to a power source apparatus for a communications apparatus or a power source apparatus for a large-scale computer.

The invention claimed is:

1. A power source system for converting an input power from an alternating current (AC) power source or a DC (direct current) power source to DC power and for supplying the DC power to a load, the power source system comprising:
   a first power source apparatus connected to the input power, and configured to convert the input power to the DC power in accordance with a first instruction from a first control apparatus;
   a second power source apparatus connected to a storage battery, and configured to convert power supplied from the storage battery to the DC power in accordance with a second instruction from a second control apparatus, output units of the first and second power source apparatuses being connected in parallel; and the first and second control apparatuses respectively connected to the first and second power source apparatuses and respectively sending the first and second instructions to the first and second power source apparatuses,
the first control apparatus including
a first voltage detector connected to an output of the first power source apparatus, and
a first voltage regulator configured to obtain a first differential between a first voltage detected by the first voltage detector and a first voltage command value, to thereby adjust the first instruction to decrease the first differential to zero,
the second control apparatus including
a second voltage detector connected to an output of the second power source apparatus, and
a second voltage regulator configured to obtain a second differential between a second voltage detected by the second voltage detector and a second voltage command value, to thereby adjust the second instruction to decrease the second differential to zero,
the second voltage command value being adjustable in accordance with an output of the first voltage regulator and an outage status of the input power, such that the first and second power source apparatuses operate in one of
a normal mode in which the first power source apparatus supplies all power to the load,
a back-up mode in which the second power source apparatus supplies all power to the load, and
an assist mode in which the first power source apparatus supplies a portion of the power and the second power source apparatus supplies the remainder of the power to the load.

2. The power source system according to claim 1, wherein
the first control apparatus is configured to control the first power source apparatus so as to reduce an output voltage of the first power source apparatus in accordance with increase in output current of the first power source apparatus, and
the second control apparatus is configured to control the second power source apparatus so as to reduce an output voltage of the second power source apparatus in accordance with increase in output current of the second power source apparatus.

3. The power source system according to claim 2, wherein the second control apparatus has separate characteristics for reducing the output voltage of the second power source apparatus in accordance with the output current thereof, for each of the normal mode, the back-up mode and the assist mode.

4. The power source system according to claim 3, wherein the second control apparatus is configured to so control the output voltage of the second power source apparatus that the output voltage of the second power source apparatus at a zero load in the assist mode is lower than the output voltage of the second power source apparatus at the zero load in the back-up mode.

5. The power source system according to claim 3, wherein the second control apparatus is configured to so control the output voltage of the second power source apparatus that an amount of reduction in the output voltage of the second power source apparatus with respect to the output current thereof in the assist mode is set to be greater than the amount of reduction in the output voltage of the second power source apparatus with respect to the output current thereof in the back-up mode.

6. The power source system according to claim 5, wherein the second control apparatus sets the amount of reduction in the output voltage of the second power source apparatus in proportion to the output current thereof.

7. The power source system according to claim 2, wherein the second control apparatus sets an amount of reduction in the output voltage of the second power source apparatus in proportion to the output current of the second power source apparatus.

8. The power source system according to claim 1, wherein the first and second control apparatuses implement a transfer from the normal mode to the assist mode when the output current of the first power source apparatus reaches a first threshold value.

9. The power source system according to claim 1, wherein the first and second control apparatuses implement a transfer from the assist mode to the normal mode, when at least one of first and second conditions is established, wherein
the first condition is that the output current of the second power source apparatus has become equal to or lower than a second threshold value; and
the second condition is that the output current of the first power source apparatus has become equal to or lower than a third threshold value.

10. The power source system according to claim 1, wherein
the first power source apparatus further includes a plurality of first power sources apparatuses; and
the first and second control apparatuses implement a transfer from the normal mode to the assist mode when output current of a prescribed number of the first power source apparatuses reaches a fourth threshold value.

11. The power source system according to claim 1, wherein
the first power source apparatus further includes a plurality of first power sources apparatuses;
the second power source apparatus further includes a plurality of second power sources apparatuses; and
the first and second control apparatuses implement a transfer from the assist mode to the normal mode, when at least one of third and fourth conditions is established, wherein
the third condition is that output current of a prescribed number of the second power source apparatuses has become equal to or lower than a fifth threshold value; and
the fourth condition is that output current of a prescribed number of the first power source apparatuses has become equal to or lower than a sixth threshold value.

12. The power source system according to claim 1, wherein the first and second control apparatuses are different from each other.

13. A power source system for supplying DC (direct current) power to a load, comprising:
a plurality of first power source apparatuses that are connected to an alternating current (AC) power source, each first power source apparatus being configured to convert AC power received from the AC power source to first DC power; and
a plurality of second power source apparatuses that are each connected to a battery, and are each configured to convert power of the corresponding battery to second DC power, wherein
each of the plurality of first power source apparatuses includes
a first voltage detector connected to an output of said each first power source apparatus, and a first voltage regulator configured to obtain a first differential between a first voltage detected by the first voltage detector and a first voltage command value, to thereby control said each first power source apparatus to decrease the first differential to zero, each of the plurality of second power source apparatuses includes a second voltage detector connected to an output of said each second power source apparatus, and a second voltage regulator configured to obtain a second differential between a second voltage detected by the second voltage detector and a second voltage command value, to thereby control said each second power source to decrease the second differential to zero, so as to supply to the load in a normal mode, a sum of the first DC power converted by the first power source apparatuses, in a back-up mode, a sum of the second DC power converted by the second power source apparatuses, and in an assist mode, a combination of the first and second DC power converted by the first and second power source apparatuses.

14. A power source system for supplying DC (direct current) power to a load, comprising:

a first power source apparatus connected to an alternating current (AC) power source, and configured to convert AC power received from the AC power source to first DC power;

a second power source apparatus connected to a battery, and configured to convert power of the battery to second DC power;

a first control apparatus connected to the first power source apparatus, the first control apparatus including a first voltage detector connected to an output of the first power source apparatus, and a first voltage regulator configured to obtain a first differential between a first voltage detected by the first voltage detector and a first voltage command value, to thereby control the first power source apparatus to decrease the first differential to zero, a second control apparatus connected to the second power source apparatus, the second control apparatus including a second voltage detector connected to an output of the second power source apparatus, and a second voltage regulator configured to obtain a second differential between a second voltage detected by the second voltage detector and a second voltage command value, to thereby control the second power source to decrease the second differential to zero, the second voltage command value being adjustable in accordance with an output of the first voltage regulator and an outage status of the AC power source, so as to supply to the load the first DC power in a normal mode, the second DC power in a back-up mode, and a combination of the first and second DC power in an assist mode.

15. The power source system according to claim 14, wherein the first and second control apparatuses are different from each other.

* * * * *